US012627515B2

(12) United States Patent
    Khan et al.

(10) Patent No.: US 12,627,515 B2
(45) Date of Patent: May 12, 2026

(54) SYSTEMS AND METHODS FOR CROSS-BLOCKCHAIN ACCESS AND ORCHESTRATION

(71) Applicant: Verizon Patent and Licensing Inc., Basking Ridge, NJ (US)

(72) Inventors: Ahmed A. Khan, Plano, TX (US); Nityanand Sharma, Tampa, FL (US); Mohammed Alsadi, Redmond, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 138 days.

(21) Appl. No.: 18/419,910

(22) Filed: Jan. 23, 2024

(65) Prior Publication Data

US 2025/0240181 A1      Jul. 24, 2025

(51) Int. Cl.
    *H04L 9/32*          (2006.01)
    *H04L 9/00*          (2022.01)
(52) U.S. Cl.
    CPC . *H04L 9/50* (2022.05); *H04L 9/32* (2013.01)
(58) Field of Classification Search
    CPC .................................. H04L 9/50; H04L 9/32
    See application file for complete search history.

(56) References Cited

U.S. PATENT DOCUMENTS

| | | | | |
|---|---|---|---|---|
| 11,323,269 | B2 * | 5/2022 | Cao ........................... | H04L 9/30 |
| 2021/0042744 | A1 * | 2/2021 | Zheng .................. | G06Q 20/401 |
| 2024/0137208 | A1 * | 4/2024 | Zhu ........................ | G06Q 20/40 |
| 2024/0160755 | A1 * | 5/2024 | Shi ........................ | G06F 21/606 |
| 2024/0257112 | A1 * | 8/2024 | Raman .................. | H04L 9/3239 |

* cited by examiner

*Primary Examiner* — Sarah Su
*Assistant Examiner* — Vladimir I Gavrilenko

(57)                ABSTRACT

A device may maintain, as a member of a two blockchain networks respective first and second blockchains. The first blockchain may include one or more sets of operations, and the second blockchain may include cross-chain authorization information. The device may identify a request to invoke a particular set of operations included in the first blockchain, where the request includes a set of input parameters and an identifier. The device may determine that the identifier satisfies the cross-chain authorization information included in the second blockchain, and may accordingly communicate with the second blockchain network to execute the particular set of operations. Executing the particular set of operations may include generating a set of output parameters. The device may output the set of output parameters in response to the request.

20 Claims, 11 Drawing Sheets

Orchestration blockchain
network 101

Orchestration
blockchain 105

Blockchain
network 107-1

Blockchain
109-1

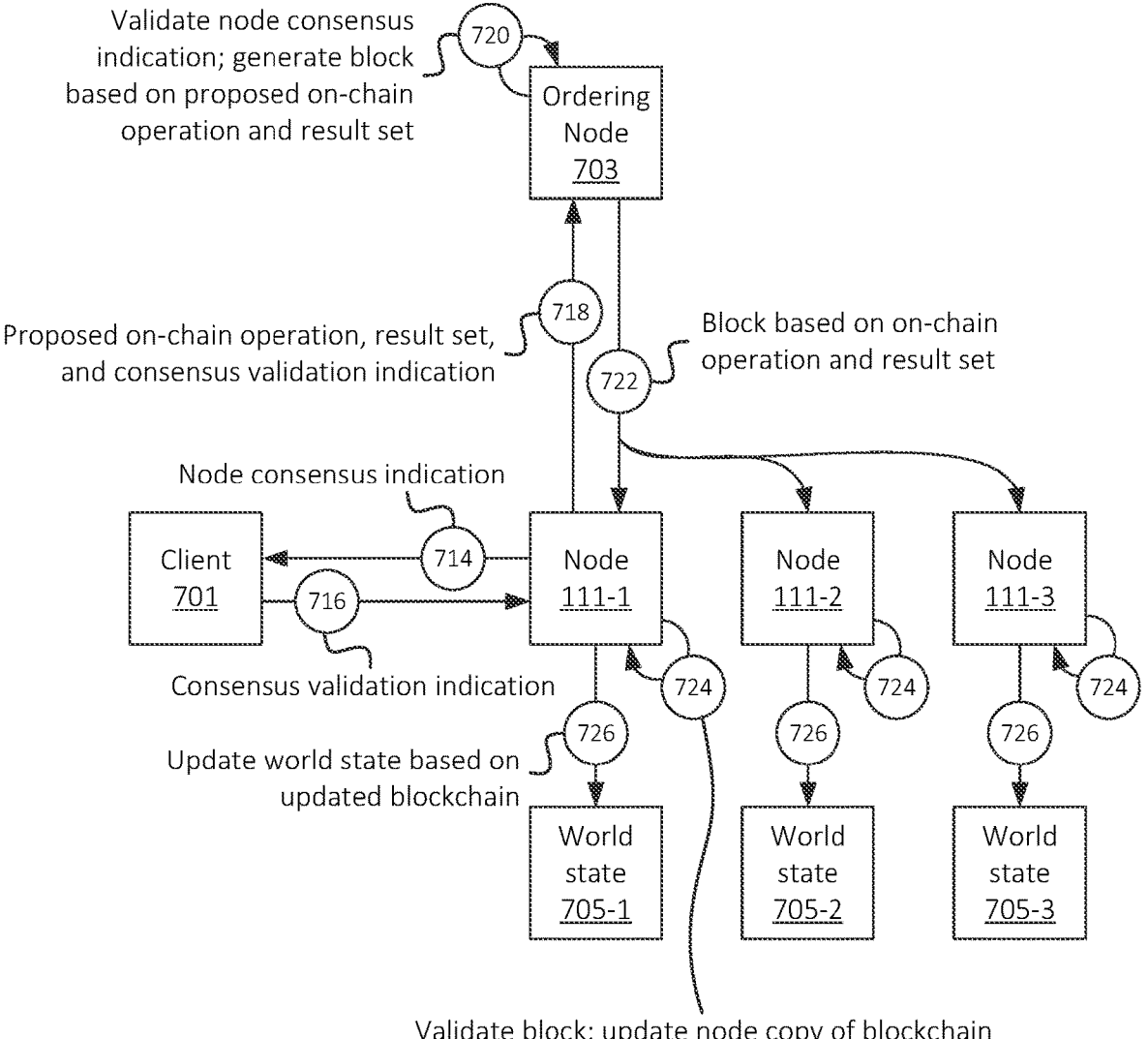

Validate node consensus indication; generate block based on proposed on-chain operation and result set Ordering Node 703

720

Proposed on-chain operation, result set, and consensus validation indication

718

722

Block based on on-chain operation and result set

Node consensus indication

Client 701

714

716

Consensus validation indication

Node 111-1

Node 111-2

Node 111-3

724

724

724

726

726

726

Update world state based on updated blockchain

World state 705-1

World state 705-2

World state 705-3

Validate block; update node copy of blockchain based on validated block

FIG. 7B

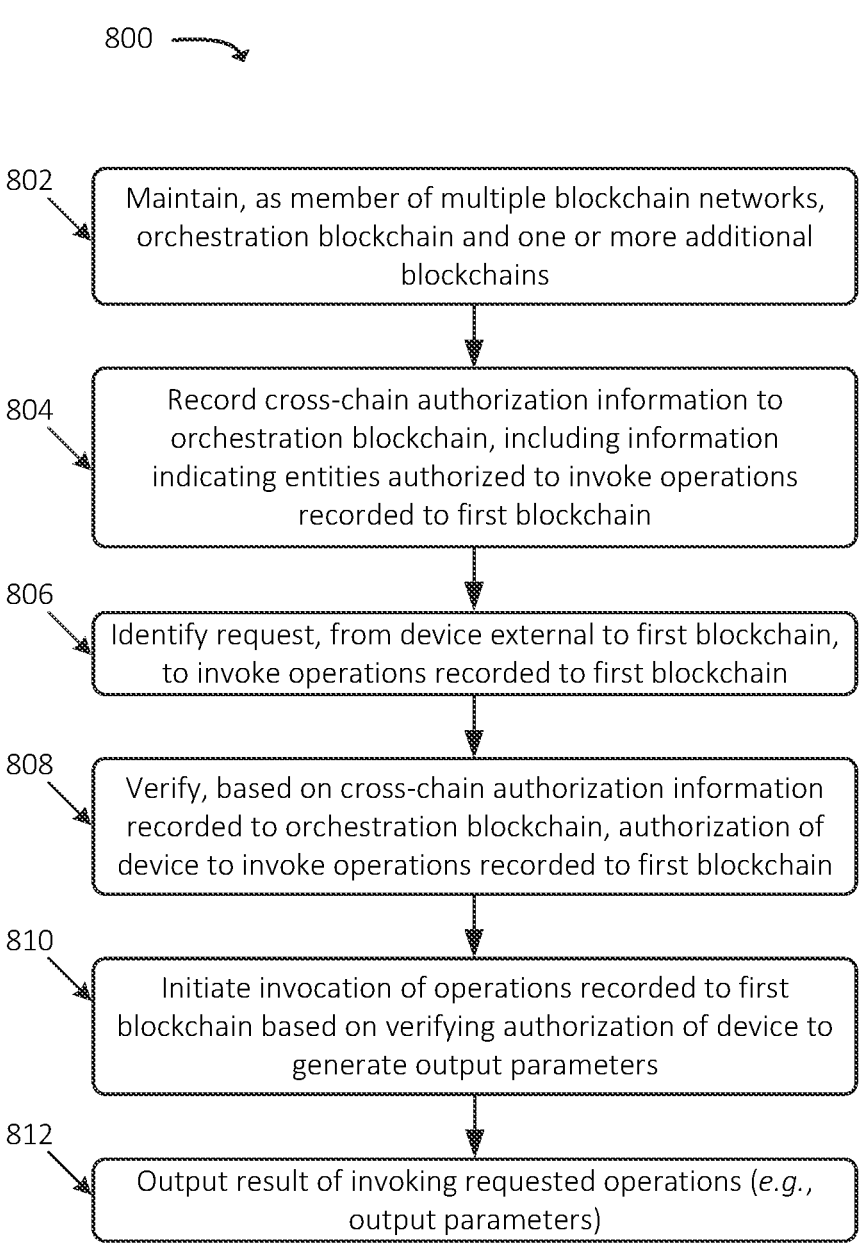

800

802 — Maintain, as member of multiple blockchain networks, orchestration blockchain and one or more additional blockchains 804 — Record cross-chain authorization information to orchestration blockchain, including information indicating entities authorized to invoke operations recorded to first blockchain 806 — Identify request, from device external to first blockchain, to invoke operations recorded to first blockchain 808 — Verify, based on cross-chain authorization information recorded to orchestration blockchain, authorization of device to invoke operations recorded to first blockchain 810 — Initiate invocation of operations recorded to first blockchain based on verifying authorization of device to generate output parameters 812 — Output result of invoking requested operations (*e.g.*, output parameters)

Bus
1010

SYSTEMS AND METHODS FOR CROSS-BLOCKCHAIN ACCESS AND ORCHESTRATION

BACKGROUND

Blockchains may provide for the decentralized and secure storage of data, decentralized computing, or other technical operations. Blockchains may further provide for the immutability of recorded data (e.g., as maintained by computing devices that implement nodes), as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations.

BRIEF DESCRIPTION OF THE DRAWINGS

FIGS. 7A and 7B illustrate example operations associated with recording information to a blockchain, in accordance with some embodiments;

FIG. 8 illustrates an example process for providing cross-chain chaincode access, in accordance with some embodiments;

DETAILED DESCRIPTION OF EXAMPLE EMBODIMENTS

The following detailed description refers to the accompanying drawings. The same reference numbers in different drawings may identify the same or similar elements.

Blockchains may be maintained by multiple nodes, such as geographically distributed or otherwise distinct servers, workstations, etc., that each maintain local copies of respective blockchains. A blockchain network may refer to a particular group of nodes that communicate with each other to maintain a particular blockchain, which may include participating in consensus mechanisms to validate records added to the blockchain, prior to the confirmation or addition of such records to the blockchain. This consensus mechanism may facilitate the decentralized nature of the blockchain, inasmuch as records are not able to be added to the blockchain without validation, verification, approval, etc. from at least a threshold quantity of the nodes (e.g., a "quorum").

The consensus mechanism may include performing computations, such as executing chaincode (e.g., instructions, code, etc. maintained on the blockchain) or other suitable computations or operations, by at least the threshold quantity of nodes. Such computations may be based on input data provided by a client device or other entity seeking to add a record to the blockchain, and may yield one or more outputs, results, etc. as a result of performing the requested computations on the provided set of input. Different blockchains may implement different application programming interfaces ("APIs"), software development kits ("SDKs"), frameworks, etc. for performing operations such as executing chaincode and verifying the results of executing such chaincode. Further, different blockchains may be developed, maintained, etc. by separate distinct entities.

Figure 1:
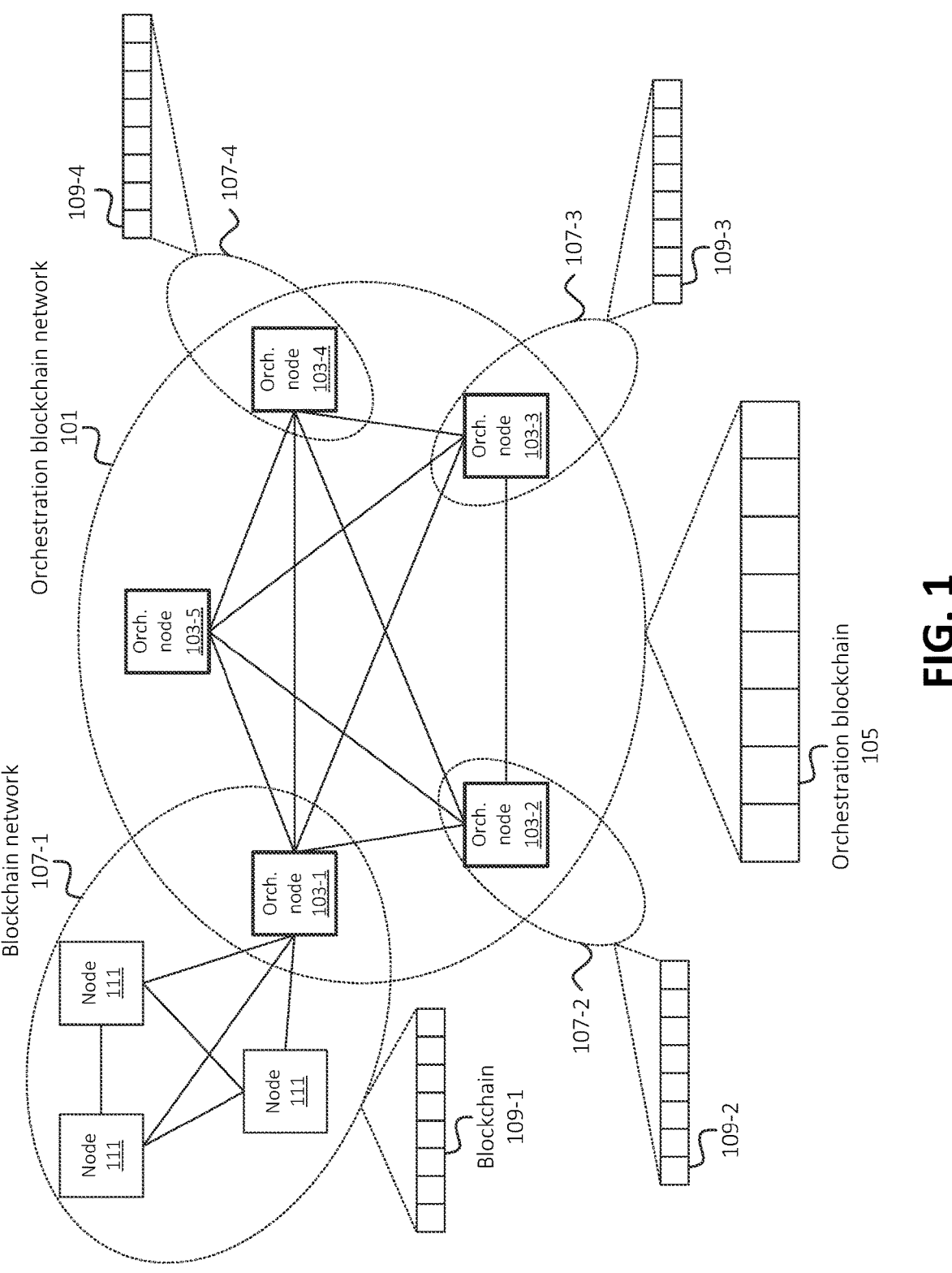
FIG. 1 illustrates an example overview of one or more embodiments described herein.

Embodiments described herein provide for a mechanism by which different blockchains may be accessed (e.g., chaincode may be invoked on different blockchains) by authorized entities, without requiring such entities to implement the APIs, SDKs, etc. of the different blockchains. For example, as shown in FIG. 1, a particular orchestration blockchain network 101 may include a group of nodes (referred to as orchestration nodes 103), such as orchestration nodes 103-1 through 103-5. Orchestration nodes 103 may communicate with each other to maintain orchestration blockchain 105. As discussed herein, blockchain 105 may include records, chaincode, and/or other information to facilitate operations described below.

In accordance with some embodiments, some or all orchestration nodes 103 may also be nodes of respective blockchain networks 107, which are also associated with their own respective blockchains 109. For example, orchestration node 103-1 may be a member of blockchain network 107-1, which maintains blockchain 109-1; orchestration node 103-2 may be a member of blockchain network 107-2, which maintains blockchain 109-2; orchestration node 103-3 may be a member of blockchain network 107-3, which maintains blockchain 109-3; and orchestration node 103-4 may be a member of blockchain network 107-4, which maintains blockchain 109-4. In this example, orchestration node 103-5 is not a member of any blockchain network other than orchestration blockchain network 101.

Figure 2A:
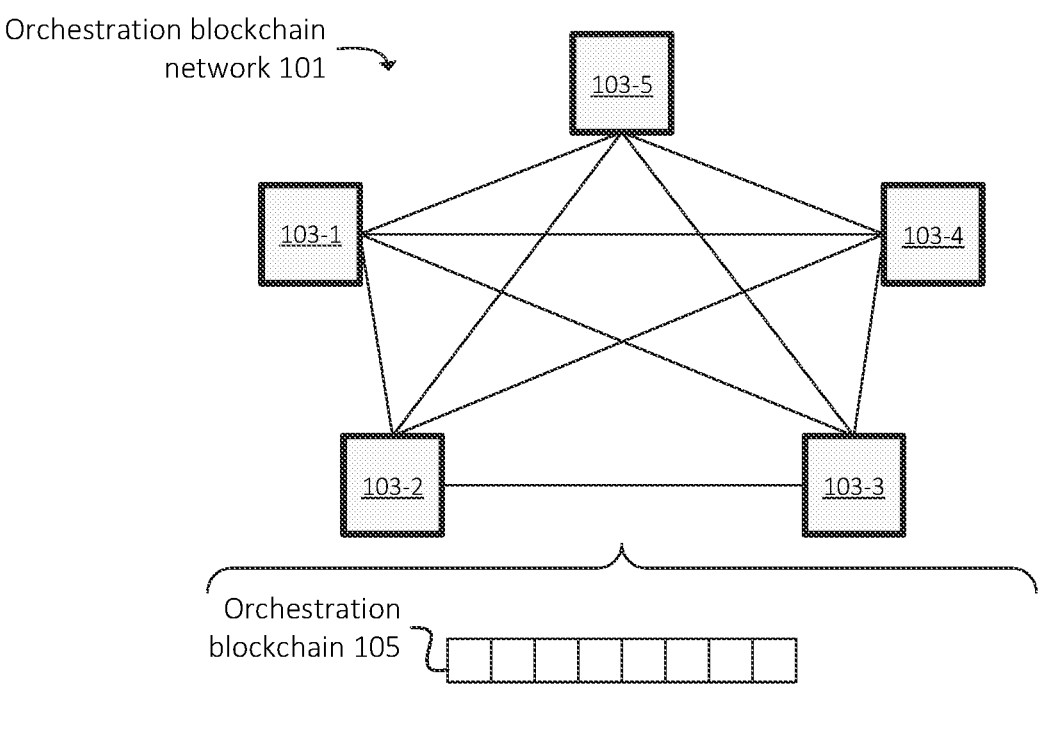
FIGS. 2A and 2B illustrate example arrangements of one or more blockchain networks, in accordance with some embodiments.
Figure 2B:
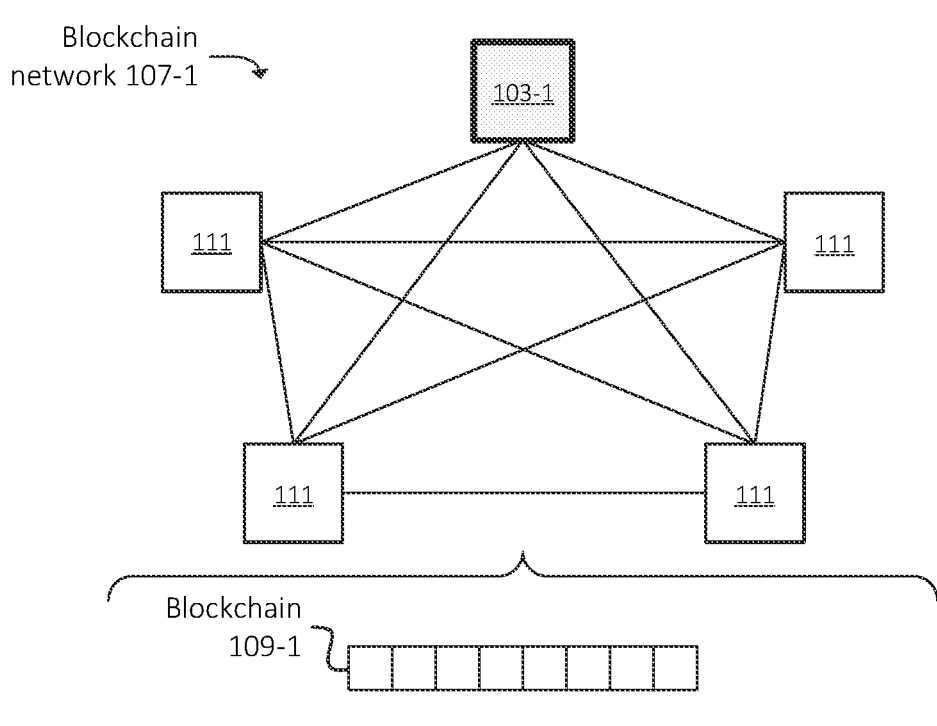

Each respective blockchain network 107 may include a respective set of nodes 111. For example, blockchain network 107-1 may include a first set of nodes 111, blockchain network 107-2 may include a second set of nodes 111, and so on (for the sake of clarity, only nodes 111 of blockchain network 107-1 are shown in FIG. 1). To further illustrate the above, FIG. 2A illustrates that orchestration nodes 103 (e.g., orchestration nodes 103-1 through 103-5) are members of orchestration blockchain network 101, and maintain orchestration blockchain 105. For example, orchestration nodes 103 may participate in suitable consensus mechanisms when recording information to orchestration blockchain 105 and/or performing operations (e.g., executing chaincode and/or recording results of executing such chaincode) with respect to orchestration blockchain 105. As shown in FIG. 2B, orchestration node 103-1 (e.g., which is the same orchestration node 103-1 that is a member of orchestration blockchain network 101 as shown in FIGS. 1 and 2A) may also be a member of blockchain network 107-1, along with one or more other nodes 111. Thus, orchestration node 103-1 and the other nodes 111 of blockchain network 107-1 may also participate in suitable consensus mechanisms when recording information to blockchain 109-1 and/or performing operations (e.g., executing chaincode and/or recording results of executing such chaincode) with respect to blockchain 109-1. Returning to FIG. 1, similar concepts may apply to the other blockchains 109. For example, orchestration node 103-2 and the other nodes 111 of blockchain network 107-2 may participate in suitable consensus mechanisms when performing operations with respect to blockchain 109-2, and so on. In this manner, respective blockchains 109 may be operated or maintained independently of each other, and one or more member nodes of such blockchains 109 may also be members of orchestration blockchain network 101.

In some embodiments, some or all of blockchain networks 107 may be "private" or "permissioned" blockchain networks, such that only certain entities, devices, or systems are authorized to access (e.g., view) respective associated blockchains 109. In the examples provided herein, assume that only nodes (e.g., nodes 111 and/or orchestration nodes 103) that are members of blockchain networks 107 are authorized to access respective blockchains 109 associated blockchain networks 107. For example, a particular node 111, that is a member of blockchain network 107-2 and is not a member of blockchain network 107-1, may have access to blockchain 109-2 with which blockchain network 107-2 is associated and may not have access to blockchain 109-1 with which blockchain network 107-1 is associated.

Figure 3:
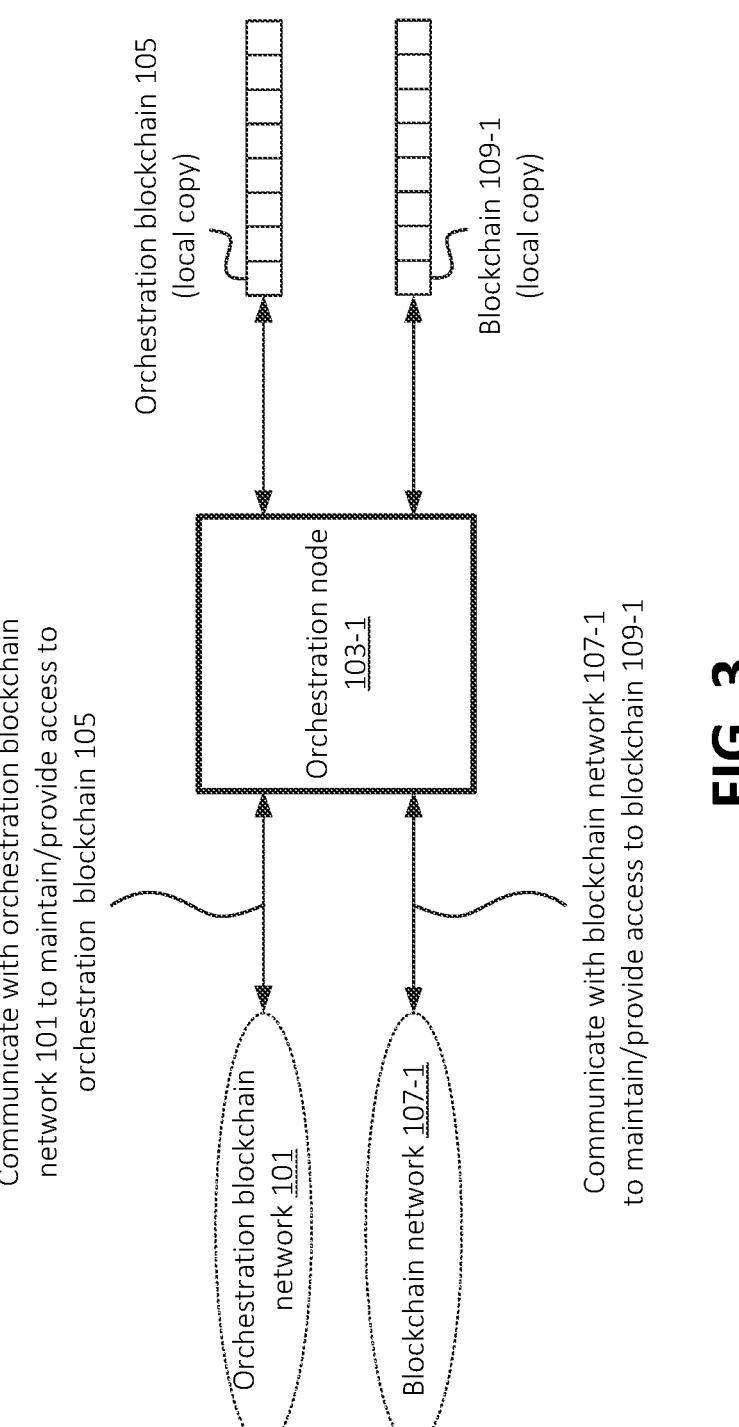
FIG. 3 illustrates example operations performed by an orchestration node to maintain a blockchain and an orchestration blockchain, in accordance with some embodiments.

As shown in FIG. 3, orchestration node 103-1 may communicate with orchestration blockchain network 101 (e.g., with other orchestration nodes 103, such as orchestration nodes 103-2 through 103-5) to maintain orchestration blockchain 105. Orchestration node 103-1 may also communicate with blockchain network 107-1 (e.g., with other nodes 111 of blockchain network 107-1) to maintain blockchain 109-1. Orchestration node 103-1 may accordingly maintain a local copy of orchestration blockchain 105, and may also maintain a local copy of blockchain 109-1. As discussed above, communicating with orchestration blockchain network 101 and/or blockchain network 107-1 may include participating in consensus mechanisms to update orchestration blockchain 105 and/or blockchain 109-1 (e.g., where updates to orchestration blockchain 105 and/or blockchain 109-1 are recorded to the respective local copies maintained by orchestration nodes 103), executing chaincode recorded to orchestration blockchain 105 and/or blockchain 109-1, etc.

In some embodiments, as noted above, a given orchestration node 103 may communicate with other orchestration nodes 103 (e.g., may be a member of orchestration blockchain network 101), but may not be a member of other blockchain networks 107 (e.g., may only be a member of orchestration blockchain network 101). In some embodiments, a given orchestration node 103 may be a member of orchestration blockchain network 101, as well as of multiple blockchain networks 107. In such scenarios, orchestration node 103 may implement different sets of SDKs, APIs, libraries, etc. associated with maintaining, providing access to, and/or performing other operations with respect to multiple blockchains 109.

Figure 4:
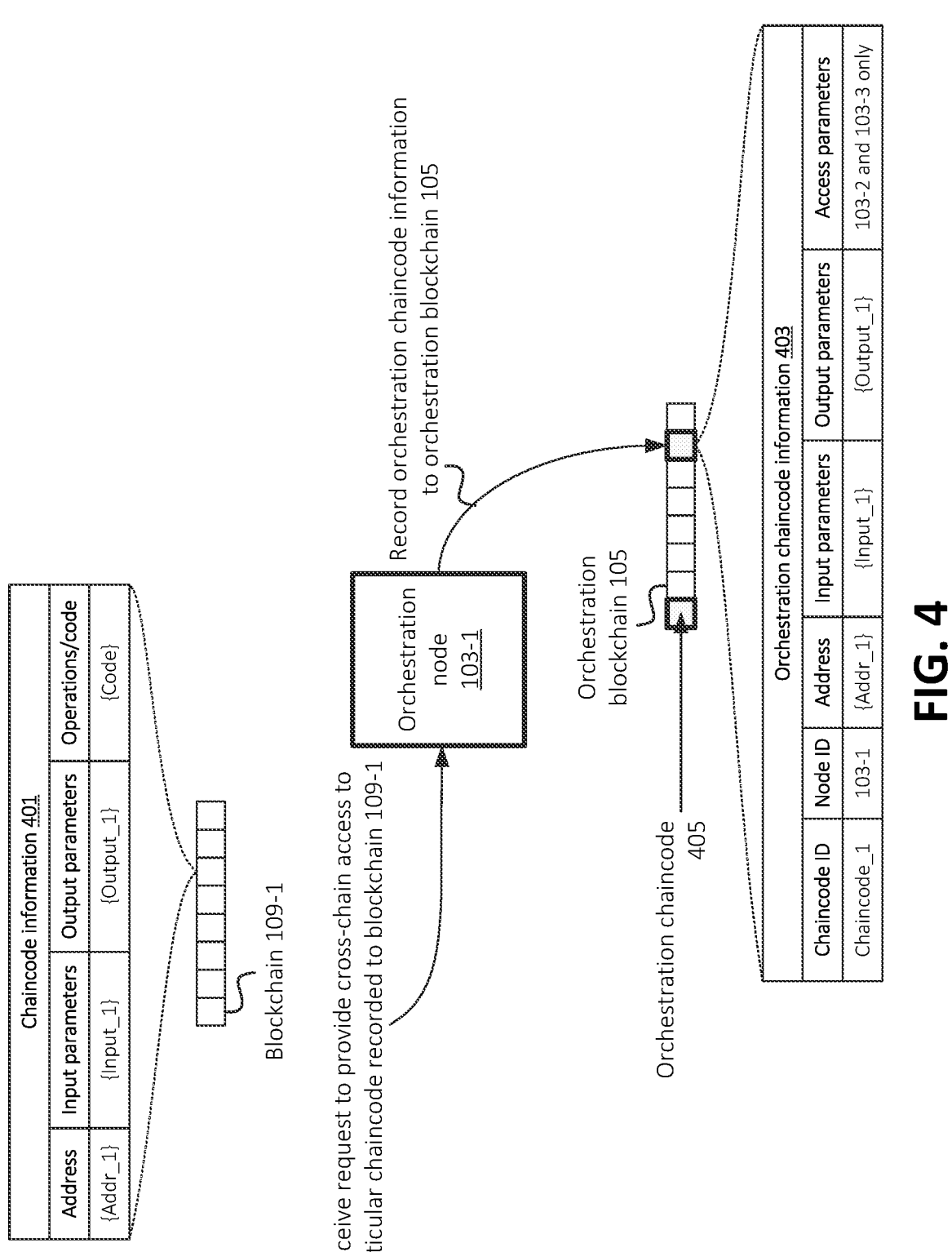
FIG. 4 illustrates an example of recording orchestration chaincode information to an orchestration blockchain, in accordance with some embodiments.

As discussed above, each respective blockchain 109 may include chaincode that, in accordance with some embodiments, may be made accessible to other entities (e.g., other orchestration nodes 103 of orchestration blockchain network 101 and/or other devices or systems that are external to orchestration blockchain network 101) via orchestration blockchain 105. FIG. 4 illustrates an example of registering chaincode, associated with a particular blockchain network

107, with orchestration blockchain network 101, so that the chaincode may be invoked via another orchestration node 103. Specifically, for example, registering the chaincode may include recording information, regarding the chaincode, to orchestration blockchain 105 that may be accessed by the orchestration node 103 (e.g., associated with a different blockchain network 107) so that the other orchestration node 103 may request execution of the chaincode.

The chaincode to be registered with orchestration blockchain network 101 may be chaincode that is recorded to a particular blockchain 109-1. For example, as shown, blockchain 109-1 may include one or more records that include chaincode information 401, which specifies particular chaincode as recorded to blockchain 109-1 (e.g., as maintained by orchestration node 103-1 and one or more other nodes 111 of blockchain network 107-1). While FIG. 4 shows one instance of chaincode information 401 associated with one particular chaincode, blockchain 109-1 may include multiple instances of chaincode information 401 for different chaincode recorded to blockchain 109-1. In some embodiments, chaincode information 401 may represent or may be included in world state information associated with blockchain 109-1 (e.g., information maintained by orchestration node 103-1 and/or some other device or system based on information recorded to blockchain 109-1).

In this example, chaincode information 401 may include one or more addresses, links, pointers, etc. associated with blockchain 109-1, represented as "{Addr_1}." The one or more addresses, links, etc. may be references to one or more records of blockchain 109-1 that include information associated with the particular chaincode. Chaincode information 401 may also include input parameter and output parameter information associated with the particular chaincode, represented as "{Input_1}" and "{Output_1}," respectively. The input parameter information may specify information regarding inputs to provide to the particular chaincode, based on which one or more outputs may be generated as a result of invoking the particular chaincode. The input parameter information may, for example, specify particular types and/or quantity of parameters (e.g., values) to be provided as input, constraints or policies with respect to such parameters (e.g., integers greater than zero, maximum quantity of characters for a given input value, etc.), a format or arrangement of input parameters, and/or other suitable information regarding inputs for the particular chaincode. Similarly, the output parameter information may indicate types or quantities of output values generated as a result of the particular chaincode performing one or more operations on the input values, a format of the output values, etc.

Chaincode information 401 may also include a set of operations, executable code, etc. to be performed when the particular chaincode is invoked (represented in the figure as "{Code}"). When the particular chaincode is invoked, orchestration node 103-1 and/or one or more other nodes 111 of blockchain network 107-1 may perform the specified operations, execute the code, etc., using a provided set of input parameters.

As shown, orchestration node 103-1 may receive a request to provide cross-chain access to the particular chaincode. For example, orchestration node 103-1 may receive such request from a client device that is communicatively coupled to orchestration node 103-1, from another node 111 of the same blockchain network 107-1 of which orchestration node 103-1 is a member, and/or from some other suitable source. The request may be received via an API, web interface, decentralized application ("dAPP"), and/or some other suitable communication pathway associated with orchestration node 103-1.

In some embodiments, the request may be implemented via a record that is recorded to blockchain 105. For example, another orchestration node 103 and/or some other suitable device or system (e.g., a device that may be authenticated by orchestration node 103-1 and verified as authorized to issue such requests) may initiate the recordation of one or more records to orchestration blockchain 105. The one or more records may include an identifier of orchestration node 103-1 and/or some other suitable information (e.g., an identifier of blockchain 109-1, an identifier or other criteria, or the like) based on which orchestration node 103-1 may identify the request to provide cross-chain access to the particular chaincode.

The request may specify the address or addresses on blockchain 109-1 with which the chaincode is associated with (e.g., {Addr_1}), and/or may otherwise indicate that the access to invoke the chaincode represented by chaincode information 401 should be provided to one or more devices external to blockchain network 107-1. In some embodiments, the request may include labels, metadata, descriptions, comments, etc. associated with the particular chaincode. For example, the request may include a "friendly" name or description of the particular chaincode, where such description may indicate in narrative form what types of operations are performed by the particular chaincode, examples of input or output values, and/or other information.

In some embodiments, the request may include information specifying access parameters, such as identifiers, policies, criteria, etc. specifying entities that are authorized to invoke the particular chaincode (e.g., that are authorized to request blockchain network 107-1 to execute the operations or code associated with the particular chaincode). The access parameters may include, for example, Internet Protocol ("IP") addresses of authorized devices, user names of authorized users, cryptographic keys or certificates, an indication of a particular set of authentication protocols or mechanisms, node identifiers (e.g., where each orchestration node 103 of orchestration blockchain network 101 may be associated with a particular node identifier that is available or accessible to other orchestration nodes 103), identifiers of respective blockchain networks 107, and/or other information that may be used to verify authorization and/or authentication of particular entities to request or initiate invocation of the particular chaincode. In some embodiments, the access parameters may include conditions or criteria that are independent of, or may be used in conjunction with, information specifying particular entities that are authorized to access the particular chaincode. For example, the access parameters may include temporal conditions (e.g., time of day, day of week, etc.), location-based conditions (e.g., a geographical location of an entity attempting to access the particular chaincode), and/or other suitable conditions or criteria.

Orchestration node 103-1 may further initiate a recordation of some or all of the information associated with accessing the particular chaincode, received in the request, to orchestration blockchain 105. For example, orchestration node 103-1 may communicate with other orchestration nodes 103 of orchestration blockchain network 101 to record some or all of such information to orchestration blockchain 105. In some embodiments, orchestration node 103-1 may propose a recordation of the data, and some or all of the other orchestration nodes 103 may participate in a consensus mechanism to validate, confirm, etc. the recordation of the data to orchestration blockchain 105.

The information, recorded to orchestration blockchain 105 based on the received request, is illustrated in FIG. 4 as orchestration chaincode information 403. In some embodiments, recording (or initiating the recording of) orchestration chaincode information 403 to orchestration blockchain 105 may include invoking other chaincode that has been recorded to orchestration blockchain 105, such as orchestration chaincode 405. In some embodiments, orchestration chaincode 405 may have been recorded to orchestration blockchain 105 as part of an initialization or configuration procedure of orchestration blockchain 105 or of orchestration blockchain network 101. In some embodiments, orchestration chaincode 405 may have been recorded to orchestration blockchain 105 at some other time or as part of some other procedure.

Orchestration chaincode 405 may be invoked (e.g., by orchestration node 103-1) in order to add records for cross-chain access to chaincode recorded to other blockchains 109. Orchestration chaincode 405 may, for example, indicate particular parameters or values of chaincode for which cross-chain access to be provided. Such parameters or values may be received as part of the request (e.g., from orchestration node 103-1). For example, orchestration node 103-1 may provide an address on blockchain 109-1 of the particular chaincode, access parameters, etc. as input when invoking orchestration chaincode 405. One or more other orchestration nodes 103 of orchestration blockchain network 101 may participate in a consensus mechanism to approve, validate, etc. the invocation of orchestration chaincode 405, where a result of invoking orchestration chaincode 405 includes recording orchestration chaincode information 403 to orchestration blockchain 105.

As shown, orchestration chaincode information 403 may include an identifier of the particular chaincode. The identifier may be a name, randomly generated number, or other value that uniquely identifies the particular chaincode indicated by orchestration node 103-1 in the request. In some embodiments, orchestration node 103-1 may provide the chaincode identifier as an input parameter when invoking orchestration chaincode 405 (e.g., out of a set of input parameters specified by orchestration chaincode 405). Additionally, or alternatively, the chaincode identifier may be generated as one of the operations of invoking orchestration chaincode 405 (e.g., orchestration nodes 103 of orchestration blockchain network 101 may generate the chaincode identifier as part of executing orchestration chaincode 405).

Orchestration chaincode information 403 may also include an identifier of orchestration node 103-1, such as an IP address, a node identifier, a particular address in an address space associated with orchestration blockchain 105, or other suitable information based on which orchestration node 103-1 may be identified. For example, invoking orchestration chaincode 405 may include providing the identifier of orchestration node 103-1 as a particular input parameter to orchestration chaincode 405 (e.g., out of a set of input parameters specified by orchestration chaincode 405).

Orchestration chaincode information 403 may also include one or more addresses with which the particular chaincode is associated with. For example, the one or more addresses may be in an address space associated with blockchain 109-1, such that chaincode information 401 may be identified via the one or more address when accessing blockchain 109-1.

Orchestration chaincode information 403 may also include input and output parameters associated with the particular chaincode. For example, as discussed above, such information may specify types, constraints, etc. associated with input parameters based on which the particular chaincode may be invoked to perform a set of operations to generate a given set of output parameters.

Orchestration chaincode information 403 may also include access parameters, based on which access or authorization to invoke the particular chaincode may be specified. As discussed above, such access parameters may include identifiers of authorized entities (e.g., orchestration nodes 103 or other devices or systems), temporal constraints, keys or certificates, etc.

While FIG. 4 illustrates an example of orchestration chaincode information 403 being recorded for one particular chaincode, similar operations may be performed to record additional orchestration chaincode information 403 for other chaincode that is associated with orchestration node 103-1 (e.g., blockchain network 107-1) and/or other orchestration nodes 103 (e.g., other blockchain networks 107), to orchestration blockchain 105. In this manner, orchestration blockchain 105 may maintain access parameters, descriptions, blockchain address references, and/or other suitable information for multiple different instances of chaincode recorded to multiple different blockchains 109.

Figure 5:
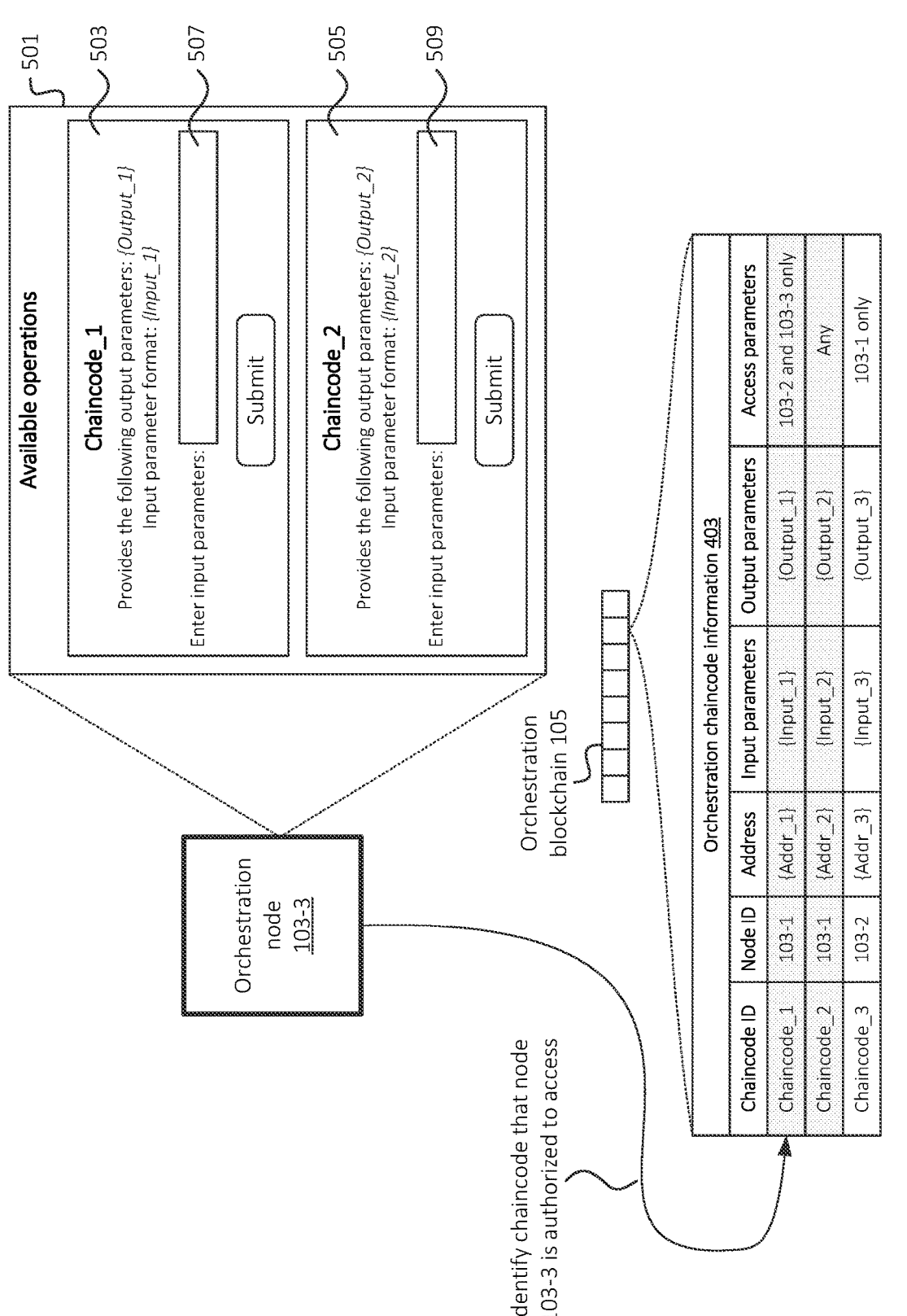
FIG. 5 illustrates an example user interface, in accordance with some embodiments.

Orchestration chaincode information 403 may be accessed by orchestration nodes 103, which may facilitate the orchestration of cross-chain invoking of chaincode associated with various blockchains 109. FIG. 5 illustrates an example of a particular orchestration node 103-3 accessing orchestration chaincode information 403 as recorded to orchestration blockchain 105. In this example, orchestration chaincode information 403 includes information regarding three different chaincodes (referred to as "Chaincode_1," "Chaincode_2," and "Chaincode_3" in the figure) for which access has been granted. While shown as a single table in the figure, orchestration chaincode information 403 may reflect a world state of orchestration blockchain 105, that is based on multiple records (e.g., which may be non-consecutive records) maintained by orchestration blockchain 105. For example, a first record of orchestration blockchain 105 may include orchestration chaincode information 403 for Chaincode_1, a second record may include orchestration chaincode information 403 for Chaincode_2, and a third record may include orchestration chaincode information 403 for Chaincode_3.

As noted above, a "particular chaincode" may refer to a particular set of operations to perform on a set of inputs in order to generate a set of outputs. As also noted above, the particular chaincode may be recorded to a single record on a particular blockchain (e.g., a particular blockchain 109), or to multiple records on the particular blockchain. The plural "chaincodes" may refer to multiple distinct sets of operations. For example, a first chaincode may refer to a first set of operations (e.g., which may be associated with a first chaincode identifier) and a second chaincode may refer to a second set of operations (e.g., which may be associated with a second chaincode identifier). The first chaincode and the second chaincode may be referred to, in plural, as "chaincodes."

As indicated by the highlighting in the figure, orchestration node 103-3 may identify that orchestration node 103-3 is authorized to access (e.g., invoke) Chaincode_1 and Chaincode_2, and/or that orchestration node 103-3 is not authorized to access Chaincode_3. In accordance with some embodiments, orchestration node 103-3 may present (e.g., via an API, a dApp, a web portal, or some other suitable communication pathway) user interface ("UI") 501. UI 501 may include information and/or UI elements (e.g., buttons, text fields, etc.) associated with the respective chaincode that has been identified as accessible to orchestration node 103-3. For example, UI 501 may include a first display area 503 that is associated with Chaincode_1, and a second display area 505 that is associated with Chaincode_2. Orchestration node 103-3 may, for example, programmatically or automatically generate two display areas 503 and 505 based on identifying two chaincodes that orchestration node 103-3 is authorized to access.

Display areas 503 and 505 may each include information that is derived from, or that includes, some or all of the orchestration chaincode information 403 associated with each respective display area 503 or 505. For example, display area 503 may include a name, description, listing of input and/or output parameters, etc. for Chaincode_1, and display area 505 may include a name, description, listing of input and/or output parameters, etc. for Chaincode_2. Display areas 503 and 505 may also include UI elements, such as respective text boxes 507 and 509, via which input parameters may be specified. In some embodiments, a user may communicate with orchestration node 103-3 to access UI 501 in order to identify chaincode that is available to be invoked by orchestration node 103-3, and to initiate requests to invoke particular chaincode with a corresponding set of input parameters.

In some embodiments, in addition to, or in lieu of presenting UI 501, orchestration node 103-3 may provide similar information or options via some other suitable mechanism. For example, orchestration node 103-3 may output a scripting file, executable code, metadata, etc. to one or more other devices or systems, based on which the other devices or systems generate or present UI 501 or otherwise initiate cross-chain chaincode access requests.

Figure 6:
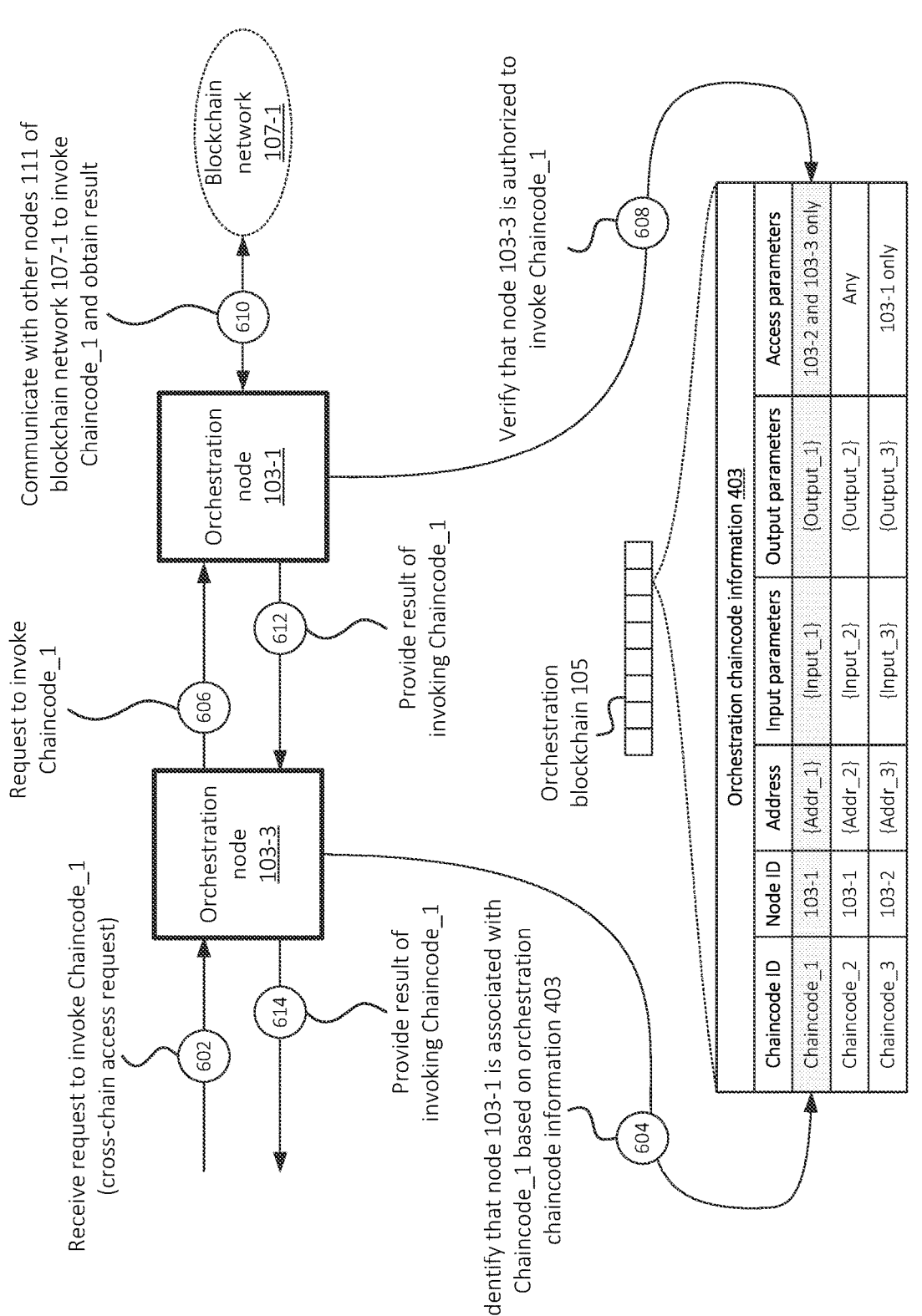
FIG. 6 illustrates an example for providing cross-chain chaincode access, in accordance with some embodiments.

As shown in FIG. 6, orchestration node 103-3 may receive (at 602) a cross-chain access request, such as a request to invoke Chaincode_1. As discussed above, orchestration node 103-3 may receive the request via a selection or input of an element of UI 501, via an API, and/or via some other suitable mechanism. In this example, the request may specify Chaincode_1, and/or may otherwise include information based on which 103-3 may identify that Chaincode_1 is the particular chaincode to which the request is directed. The request may further include a set of input parameters, such as a set of input parameters that match formats, constraints, types, etc. specified as input for Chaincode_1. In this example, assume that the input correctly matches such formats, constraints, types, etc. In situations where the request does not correctly match such formats, constraints, types, etc., orchestration node 103-3 may identify such mismatch or error, and may reject the request (at 602) in lieu of performing subsequent operations, in order to give the requestor an opportunity to provide appropriate input parameters.

Orchestration node 103-3 may identify (at 604) that orchestration node 103-1 is associated with the requested particular chaincode. For example, orchestration node 103-3 may identify orchestration chaincode information 403 associated with Chaincode_1, and may identify an IP address, node identifier, or other suitable identifying information of orchestration node 103-1.

Orchestration node 103-3 may use the node identifying information of orchestration node 103-1 to communicate with orchestration node 103-1, in order to request (at 606) access to Chaincode_1. For example, orchestration node 103-3 may use the IP address to communicate with orchestration node 103-1 via a Packet Data Network ("PDN") such as the Internet, may use a node identifier or other type of identifier to communicate with orchestration node 103-1 via a routing mesh or containerization platform, and/or may otherwise communicate with orchestration node 103-1 based on identifying that orchestration node 103-1 is associated with Chaincode_1 for which cross-chain access has been requested. In some embodiments, the request may include an identifier of orchestration node 103-3 (e.g., an IP address, a node identifier, etc.), authentication information (e.g., an authentication token, one or more keys, a digital signature, etc.), or the like.

Additionally, or alternatively, in some embodiments, orchestration node 103-3 may provide (at 606) the request in the form of cross-chain access request information recorded to orchestration blockchain 105. For example, based on receiving (at 602) the request, orchestration node 103-3 may initiate recordation of cross-chain access request information to orchestration blockchain 105, which includes information identifying Chaincode_1 (e.g., as a subject of the cross-chain access request), orchestration node 103-3 (e.g., as a requestor of the cross-chain access), and/or orchestration node 103-1 (e.g., as a recipient of the cross-chain access request). Orchestration node 103-1 may "listen to" or monitor orchestration blockchain 105 to identify such cross-chain access request information. In this sense, receiving (at 606) the request to invoke Chaincode_1 may include identifying that a request to invoke Chaincode_1 has been recorded to orchestration blockchain 105. In such embodiments, orchestration node 103-3 may not need to directly communicate with orchestration node 103-1 in order to request that Chaincode_1, recorded to blockchain 109-1 (e.g., associated with blockchain network 107-1), be invoked.

Based on receiving (at 606) the request to invoke Chaincode_1 (e.g., based on receiving the request from orchestration node 103-3, based on identifying that the request has been recorded to orchestration blockchain 105, and/or otherwise based on receiving such request), orchestration node 103-1 may identify or verify (at 608) whether orchestration node 103-3 is authorized to access or invoke the requested Chaincode_1. For example, orchestration node 103-1 may identify identification and/or authentication information included in the request from orchestration node 103-3, and may compare such information to access parameters included in orchestration chaincode information 403 for Chaincode_1. For instance, orchestration node 103-1 may determine whether orchestration chaincode information 403 indicates that an IP address, node identifier, or other identifier of orchestration node 103-3 is included in the access parameters for Chaincode_1. Additionally, or alternatively, orchestration node 103-1 may determine whether an authentication token, digital signature, or other suitable information included in the request matches or otherwise satisfies authentication mechanisms specified in the access parameters. In some embodiments, orchestration node 103-1 may verify authentication and/or authorization of orchestration node 103-3 to invoke Chaincode_1 in some other suitable manner.

In this example, assume that orchestration node 103-1 has verified (at 608) that orchestration node 103-3 is authorized to invoke the requested chaincode. Orchestration node 103-1 may accordingly initiate the invocation of the requested chaincode. For example, orchestration node 103-1 may communicate (at 610) with one or more other nodes 111 of blockchain network 107-1 to invoke Chaincode_1 (e.g., to execute some or all of the operations specified in one or more records associated with Chaincode_1, as recorded to blockchain 109-1), based on input parameters included in the request from orchestration node 103-3. As discussed above, executing such operations may include generating one or more results (e.g., one or more output parameters or values). In some embodiments, such results may be recorded to blockchain 109-1.

Since orchestration node 103-3 does not necessarily have access to blockchain 109-1 (e.g., as noted above), orchestration node 103-1 may provide (at 612) the one or more results to orchestration node 103-3. For example, in embodiments where orchestration node 103-3 has directly communicated with orchestration node 103-1 to issue (at 606) the request to invoke Chaincode_1, and/or where orchestration node 103-1 otherwise is "aware" that orchestration node 103-3 has issued such request, orchestration node 103-1 may use an IP address, node identifier, and/or other suitable communication information to output the result to orchestration node 103-3. Additionally, or alternatively, orchestration node 103-1 may record the result to orchestration blockchain 105, based on which orchestration node 103-3 may identify and receive such result. For example, the result may be recorded to orchestration blockchain 105 along with a request identifier (e.g., a unique identifier of the request (at 606) from orchestration node 103-3), an identifier of orchestration node 103-3, an identifier of orchestration node 103-1, etc., based on which orchestration node 103-3 may identify that the record is associated with (e.g., is a response to) the request to invoke the chaincode. Additionally, or alternatively, orchestration node 103-1 may record a link, Uniform Resource Locator ("URL"), or other suitable an indication the requested chaincode has been executed and a result has been generated (e.g., where the link, URL, etc. may be used to obtain the result).

Orchestration node 103-3 may provide (at 614) the result to the requestor and/or to some other suitable device or system. For example, a client device, a dApp, etc. may have made (at 602) the request to orchestration node 103-3, and orchestration node 103-3 may respond (at 614) with the result of the request. In this manner, the requesting device may not necessarily possess or require knowledge or awareness of the existence of orchestration node 103-1, blockchain network 107-1, or of blockchain 109-1. For example, from the perspective of the requesting device, orchestration node 103-3 has indicated that a particular set of operations is able to be performed in a decentralized manner (e.g., by nodes of one or more blockchains), and the requesting device may have requested that such set of operations be performed and a result provided. On the other hand, in some embodiments, orchestration node 103-3 may indicate which particular orchestration node 103-1, blockchain network 107-1, and/or blockchain 109-1 the particular chaincode is associated, and the client device may factor such information into the determination of whether to invoke the chaincode. In any event, clients or other devices making such requests via orchestration node 103-3 need not implement or have awareness of the particular APIs, SDKs, etc. implemented by orchestration node 103-1, where such APIs, SDKs, etc. are ultimately used to execute the chaincode and provide the results of executing the chaincode.

Figure 7A:
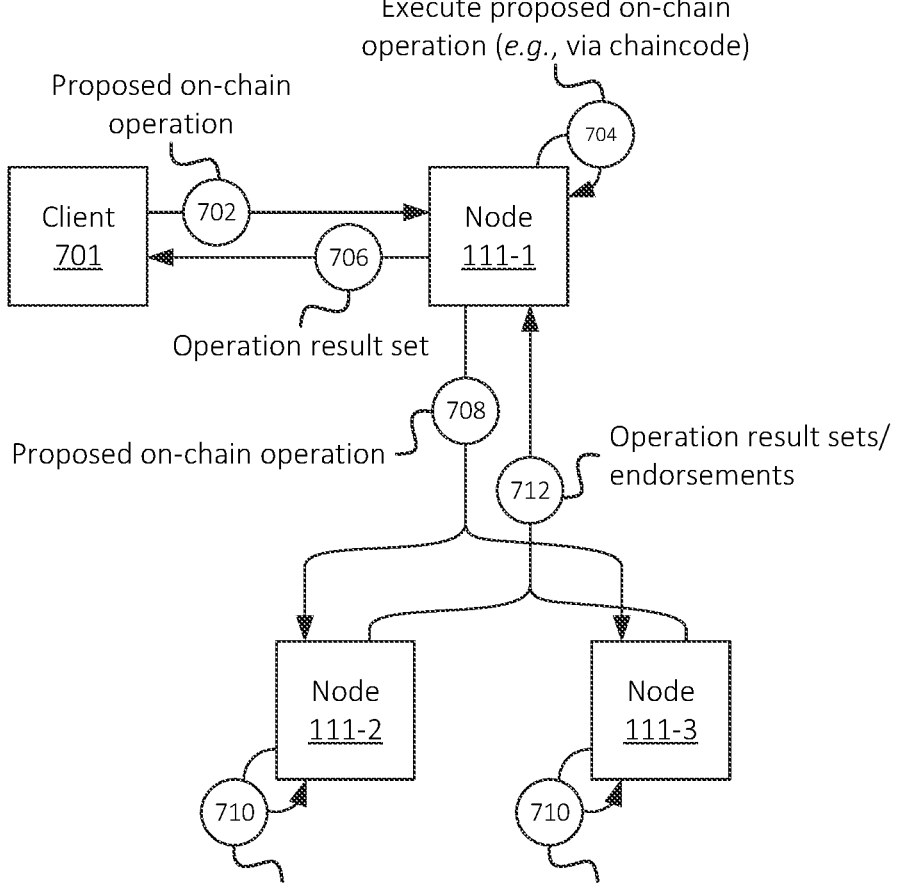

FIGS. 7A and 7B illustrate an example of modifying blockchain 109 and/or world state information based on an interaction with blockchain 109. The discussion below is provided in the context of a particular blockchain 109. However, similar concepts may apply to orchestration blockchain 105. As shown, a particular node 111-1 may receive (at 702) a proposed on-chain operation (e.g., a request to access or record information to blockchain 109) from a particular source, such as client device 701 (e.g., which may be or may be implemented by a device or system that has access to node 111-1, such as a device or system that has authentication credentials, locator information, etc. via which client device 701 is able to interact with node 111-1). In some embodiments, node 111-1 may receive the proposed on-chain operation from a blockchain management system (e.g., which may receive the proposed on-chain operation from client device 701 and may select node 111-1 out of a group of nodes 111, such as a group of nodes associated with the same channel in a channel-based blockchain system, such as the Hyperledger® Fabric), an ordering node, or other suitable device or system.

Client device 701 may be, for example, an entity associated with blockchain 109 (e.g., may be associated with an address, a "wallet," a dApp, etc.). Further, in some embodiments, operations described with respect to client device 701 may refer to operations performed by a given orchestration node 103 (e.g., a orchestration node 103 that is associated with a first blockchain network 107 and that issues requests to invoke chaincode associated with another blockchain network 107). In this example, assume that client device 701 is authorized to initiate, request, etc. the proposed on-chain operation, which may include the modification of one or more values of one or more attributes that are currently associated with blockchain 109, the addition of one or more attributes to blockchain 109, or other suitable interactions. In other examples, node 111-1 and/or some other device or system may verify that client device 701 is authorized to initiate the proposed on-chain operation. In some embodiments, as discussed above, the verification may include verifying that the proposed on-chain interaction has been received from a particular orchestration node 103 that is authorized to access or request the on-chain interaction (e.g., a request to invoke chaincode and/or to record a result of invoking such chaincode to blockchain 109).

In some embodiments, the proposed on-chain operation (received at 702) may indicate or refer to chaincode recorded to blockchain 109, which may specify one or more inputs (e.g., types of inputs, quantity of inputs, and/or other input parameters), and may also include actions to take with respect to the inputs in order to generate one or more outputs (e.g., chaincode). For example, the proposed on-chain operation may specify particular chaincode (e.g., an address or reference associated with blockchain 109 that includes a record with which the chaincode is associated) and one or more input values according to input parameters specified by the particular chaincode. In some examples, the proposed on-chain operation may refer to one or more values that have previously been recorded to blockchain 109 (and thus reflected in world state information associated with blockchain 109), such as an interaction that increments or decrements previously recorded values or performs other computations based on previously recorded values.

Node 111-1 may execute (at 704) the proposed on-chain operation, which may include accessing the one or more values that were previously recorded to blockchain 109. In order to determine the one or more values referred to in the proposed on-chain operation, node 111-1 may access world state information, maintained by node 111-1, to determine such values. Such access may include checking a local cache and/or accessing, via a network, a remote system (e.g., a "cloud" system, a containerized system, etc.) associated with node 111-1 that maintains the world state associated with blockchain 109. The execution (at 704) may be a "simulation" of the proposed on-chain operation, inasmuch as the execution and of the proposed on-chain operation and the ensuing result may not yet be recorded to blockchain 109. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 111-1 may provide (at 706) the result set (e.g., the read-write set) based on executing (at 704) the proposed interaction to client device 701. Client device 701 may maintain the result set to, for example, verify and/or to provide approval of the result set before the result set is committed to blockchain 109. Node 111-1 may also provide (at 708) the proposed on-chain operation to one or more other nodes 111 associated with blockchain 109, such as nodes 111-2 and 111-3. In some embodiments, node 111-1 may provide (at 708) the result set generated by node 111-1 to nodes 111-2 and 111-3. Nodes 111-1 through 111-3 may all be associated with the same channel, nodes 111-2 and 111-3 may be specified by the chaincode as validators, and/or nodes 111-2 and 111-3 may otherwise be identified by node 111-1 or an associated blockchain management system as nodes that should validate, endorse, etc. the execution and result of the proposed interaction.

As similarly discussed with respect to node 111-1, nodes 111-2 and 111-3 may execute (at 710), and/or simulate the execution of, the proposed interaction. Accordingly, nodes 111-2 and 111-3 may access one or more values that were previously recorded to blockchain 109 using world state information maintained by nodes 111-2 and 111-3. Nodes 111-2 and 111-3 may validate, verify, etc. the result set generated by node 111-1 by comparing the result set with respective result sets generated by nodes 111-2 and 111-3. Nodes 111-2 and 111-3 may respond (at 712) to node 111-1 with respective result sets generated by nodes 111-2 and 111-3, and/or may respond with an indication, endorsement, etc. (e.g., which may be respectively signed by nodes 111-2 and 111-3) that the result set generated by node 111-1 is valid. Once node 111-1 has received endorsements from at least a threshold quantity of other nodes (e.g., from nodes 111-2 and 111-3, in this example), node 111-1 may determine that a consensus has been reached with respect to the result set for the proposed interaction.

As shown in FIG. 7B, node 111-1 may accordingly provide (at 714), to client device 701, an indication that consensus for the result set (provided at 706) has been reached. In some embodiments, client device 701 may validate the consensus (e.g., by evaluating signatures of nodes 111-2 and 111-3) and/or may verify the result set (e.g., by itself executing the proposed interaction). Client device 701 may provide (at 716), to node 111-1, an indication that client device 701 has validated the consensus and/or has verified the result set. In some embodiments, the consensus validation indication may be signed by client device 701, thus securely authenticating the validation by client device 701.

Node 111-1 may provide (at 718) the result set, along with the consensus validation indication and the proposed on-chain operation, to ordering node 703. Ordering node 703 may be a node, associated with the same channel as nodes 111-1 through 111-3, that validates (at 720) the consensus validation indication (e.g., validates signatures associated with client device 701 and/or nodes 111-1 through 111-3) and generates a block, to be recorded to blockchain 109, that includes information regarding the on-chain operation. Such information may include an identifier of client device 701 (e.g., an address, wallet identifier, etc.), identifiers of nodes 111-1 through 111-3 that participated in generating and/or validating the result set based on the on-chain operation, chaincode inputs provided by client device 701, the consensus validation indication, one or more timestamps of the above operations and/or other events, and/or other suitable information associated with the on-chain operation. In some embodiments, the block may be signed by ordering node 703, thus securely authenticating the block creation by ordering node 703. At this point, the on-chain operation may no longer be a "proposed" on-chain operation, as the interaction has been finalized, committed, etc. by ordering node 703. In some implementations, nodes 111-1 through 111-3 may be referred to as "peers," to indicate that such nodes 111-1 through 111-3 are distinct from ordering node 703 (e.g., ordering node 703 performs one or more different operations from the peers).

Ordering node 703 may propagate (at 722) the signed block, including information regarding the finalized on-chain operation initiated by client device 701, to nodes 111-1 through 111-3 and/or other nodes associated with the same channel. Nodes 111-1 through 111-3 may validate (at 724) the block, which may include verifying the signature of ordering node 703, and may accordingly update a respective copy of blockchain 109 as maintained by each one of nodes 111-1 through 111-3. Nodes 111-1 through 111-3 may maintain respective independent copies of blockchain 109, thus providing an element of decentralization to blockchain 109. As such, when adding the block (received at 722), nodes 111-1 through 111-3 may continue to maintain separate copies of the same blockchain 109, including the information regarding the finalized on-chain operation.

Nodes 111-1 through 111-3 may also maintain respective world state information 705 (e.g., world state information 705-1, 705-2, and 705-3). For example, world state information 705 may include a portion of the information stored in blockchain 109, such as the latest version of some or all of the attributes for which information has been recorded to blockchain 109. Nodes 111-1 through 111-3 may accordingly update (at 726) respective copies of world state information 705 based on the received block. For example, in the event that the block includes a change in the value of a particular attribute, nodes 111-1 through 111-3 may update world state information 705-1 through 705-3, respectively, to replace a previous value of the attribute (e.g., a previous version of the attribute) with the newly received value of the particular attribute.

FIG. 8 illustrates an example process 800 for providing cross-chain chaincode access, in accordance with some embodiments. In some embodiments, some or all of process 800 may be performed by a particular orchestration node 103 of orchestration blockchain network 101.

As shown, process 800 may include maintaining (at 802), as a member of multiple blockchain networks, orchestration blockchain 105 and one or more additional blockchains 109. For example, the particular orchestration node 103 may be a member of orchestration blockchain network 101 (e.g., may be one orchestration node 103 out of a set of orchestration nodes 103 that communicate with each other to maintain orchestration blockchain 105, as discussed above). The particular orchestration node 103 may also be a member of one or more blockchain networks 107 (e.g., may communicate with nodes 111 of respective blockchain networks 107 to maintain respective blockchains 109). For example, orchestration blockchain 105 and the one or more other blockchains 109 may be "permissioned" or "private" blockchains to which the particular orchestration node 103 has access (e.g., viewing access, access to invoke operations such as chaincode, etc.). As discussed above, devices external to such blockchain networks 107 (e.g., other orchestration nodes 103 of orchestration blockchain network 101) may not have access to the same blockchain or blockchains 109 to which the particular orchestration node 103 has access. As discussed above, maintaining orchestration blockchain 105 and the one or more additional blockchains 109 may include communicating with respective devices (e.g., orchestration nodes 103 of orchestration blockchain network 101 and/or nodes 111 of one or more blockchain networks 107) to participate in consensus mechanisms, maintain local copies of respective blockchains, serve as an interface to respective client devices 701, etc.

As discussed above, blockchains 109 may include one or more records that indicate particular sets of operations (e.g., chaincode) that may be performed by respective nodes 111. For example, the chaincode may specify sets of input parameters and operations to perform on the input parameters to generate a set of output parameters. As discussed above, different blockchain networks 107 may utilize different APIs, SDKs, libraries, etc. to perform the respective operations, such that nodes 111 of different blockchain networks 107 may not necessarily be configured to or otherwise capable of executing or performing such operations.

Process 800 may further include recording (at 804) cross-chain authorization information to orchestration blockchain 105. As discussed above, such information may indicate or denote entities that are authorized to invoke operations recorded to the first blockchain. For example, the cross-chain authorization information may include identifiers of respective orchestration nodes 103 of orchestration blockchain network 101 (e.g., IP addresses, node identifiers, etc.), authentication mechanism information, criteria or policies, and/or other suitable authorization and/or authentication information. In some embodiments, the particular orchestration node 103 (and/or some other suitable device or system) may further provide other information associated with respective chaincodes, such as input and/or output parameters, descriptions, or the like, as discussed above.

Process 800 may additionally include identifying (at 806) a request, from a device external to a first blockchain 109 (e.g., where the particular orchestration node 103 is a member of a particular blockchain network 107 that maintains the first blockchain 109), to invoke a particular set of operations recorded to the first blockchain 109. For example, the particular orchestration node 103 may receive a request from a second orchestration node 103 of orchestration blockchain network 101 (e.g., where orchestration node 103 has identified that orchestration node 103 is authorized to request invocation of the particular set of operations based on the cross-chain authorization information recorded to orchestration blockchain 105). As another example, the particular orchestration node 103 may identify a record, as recorded to orchestration blockchain 105, requesting invocation of the particular set of operations recorded to blockchain 109. In some embodiments, the request may include an identifier of the second orchestration node 103, such as an IP address, a node identifier, an address in an address space of orchestration blockchain 105, or the like. In some embodiments, the request may include authentication information, such as a digital signature generated by the second orchestration node 103, an authentication token, or other suitable authentication information.

Process 800 may also include verifying (at 808), based on the cross-chain authorization information recorded to orchestration blockchain 105, that the external device (e.g., the second orchestration node 103) is authorized to invoke the requested operations that are recorded to the first blockchain 109. For example, the particular orchestration node 103 may verify that one or more identifiers, included in or derived from the request, meet or satisfy the cross-chain authorization information. In some embodiments, the particular orchestration node 103 may extract or otherwise determine a node identifier, address, etc. of the requesting device based on decrypting or otherwise analyzing a digital signature included in the request. In instances where the particular orchestration node 103 determines that the request is not authorized (e.g., the requesting device is not indicated by the authorization information as authorized to request invocation of the set of operations, and/or where the requesting device cannot be authenticated), the particular orchestration node 103 may forgo performing subsequent operations of process 800.

Process 800 may further include initiating (at 810) invocation of the requested operations (e.g., chaincode recorded to the first blockchain 109), based on verifying authorization and/or authentication of the external device. For example, the particular orchestration node 103 may communicate with other nodes 111 of the particular blockchain network 107, which maintains the first blockchain 109, to initiate performance of the set of operations by some or all of such nodes 111. In some embodiments, performing the set of operations may include recording a result (e.g., one or more output parameters) to the first blockchain 109.

Process 800 may additionally include outputting (at 812) the result of invoking the requested operations (e.g., the output parameters). For example, the particular orchestration node 103 may output the result to the requesting device, may record the result to orchestration blockchain 105, and/or may otherwise indicate the result to the requesting device. In this manner, the requesting device (e.g., another orchestration node 103 or some other suitable device or system) may not need to implement the same APIs, SDKs, etc. used by nodes 111 of blockchain network 107 to invoke the set of operations recorded to the first blockchain 109. On the other hand, operations described above provide the flexibility for a developer or other entity that owns or operates the first blockchain 109 to securely provide access to some of the functionality of such blockchain 109, without exposing the entirety of blockchain 109 to such external devices.

Figure 9:
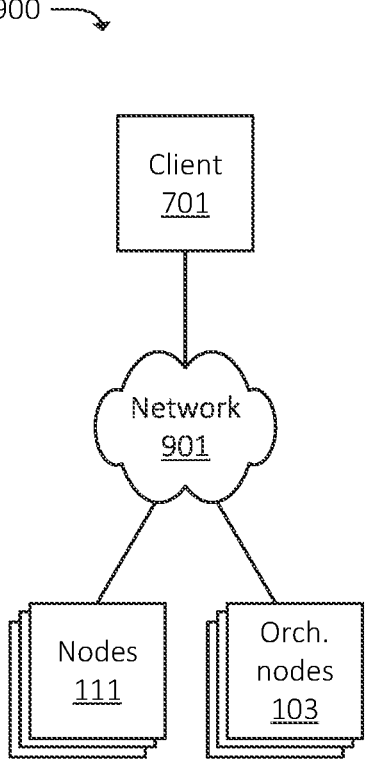
FIG. 9 illustrates an example environment in which one or more embodiments, described herein, may be implemented.

FIG. 9 illustrates an example environment 900, in which one or more embodiments may be implemented. Environment 900 may include network 901, client device 701, orchestration nodes 103, and nodes 111. In some embodiments, environment 900 may include one or more additional devices or systems communicatively coupled to network 901 and/or one or more other networks.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900. Elements of environment 900 may interconnect with each other and/or other devices via wired connections, wireless connections, or a combination of wired and wireless connections. Some or all of the elements of environment 900 may be implemented by one or more devices, sets of hardware resources, cloud systems, or the like.

Network 901 may include one or more wired and/or wireless networks. For example, network 901 may include an IP-based Packet Data Network ("PDN"), a wide area network ("WAN") such as the Internet, a private enterprise network, and/or one or more other networks. Client device 701, nodes 111, and/or other devices or systems may communicate, through network 901, with each other and/or with other devices that are coupled to network 901. Network 901 may be connected to one or more other networks, such as a public switched telephone network ("PSTN"), a public land mobile network ("PLMN"), and/or another network. Network 901 may be connected to one or more devices, such as content providers, applications, web servers, and/or other devices, with which client device 701, orchestration nodes 103, nodes 111, and/or other devices or systems may communicate.

Client device 701, orchestration nodes 103, nodes 111, and/or other devices or systems may be implemented by one or more cloud systems, server devices, or other types of hardware resources. In some embodiments, client device 701, orchestration nodes 103, and/or nodes 111 may be implemented by or communicatively coupled to a User Equipment ("UE"), which may include a computation and communication device, such as a wireless mobile communication device that is capable of communicating with network 901. The UE may communicate with network 901 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 10:
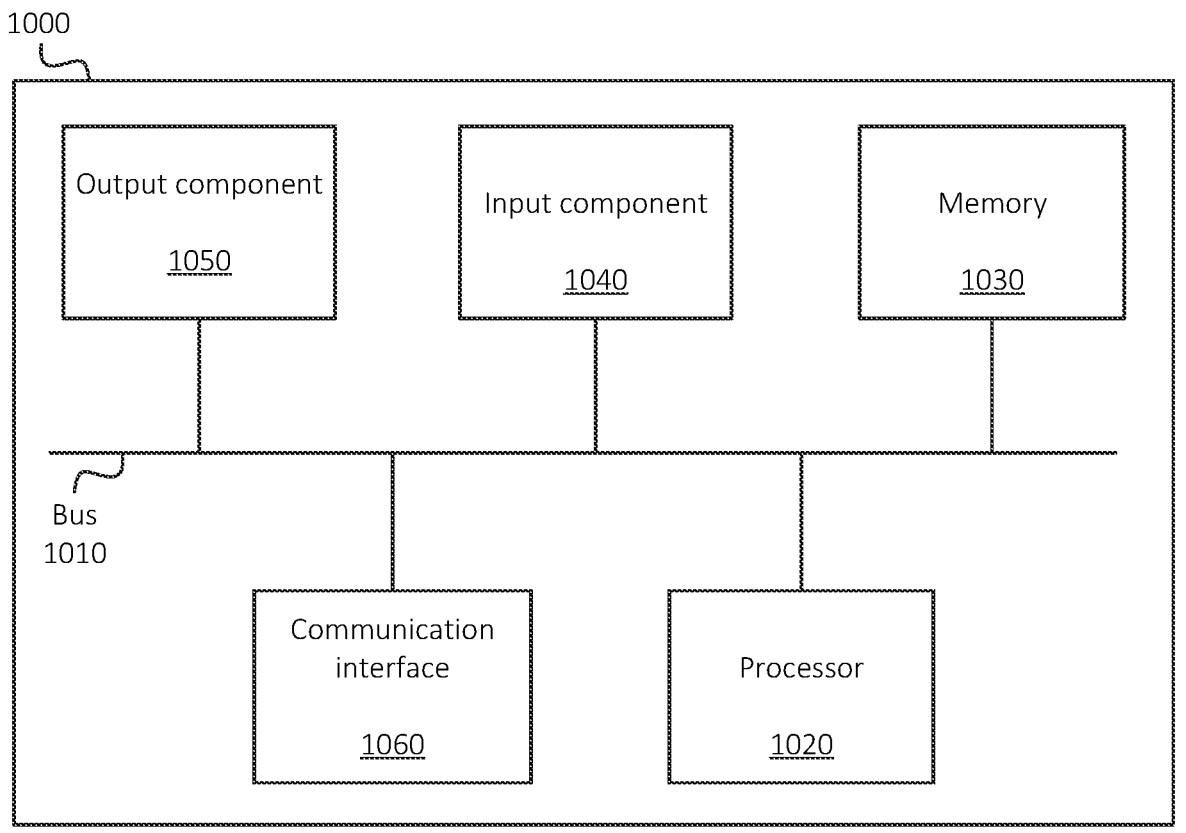
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN $a10, RAN $a12, DN $a50, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   communicate with a first set of nodes of a first blockchain network to maintain a first blockchain, wherein a first set of records recorded to the first blockchain include chaincode that specifies a plurality of sets of operations;
   communicate with a second set of nodes of a second blockchain network to maintain a second blockchain, wherein a second set of records recorded to the second blockchain include cross-chain authorization information that includes a set of identifiers;
   identify a request to invoke particular chaincode, which includes a particular set of operations of the plurality of sets of operations included in the first set of records recorded to the first blockchain, wherein the request includes:
   a set of input parameters, and
   one or more identifiers;
   compare the one or more identifiers, included in the request, to the set of identifiers included in the cross-chain authorization information included in the second set of records recorded to the second blockchain;
   determine, based on the comparing, whether the one or more identifiers included in the request satisfy the cross-chain authorization information included in the second blockchain;
   when determining that the one or more identifiers included in the request do not satisfy the cross-chain authorization information, forgo causing the second blockchain network to execute the particular chaincode, which includes the particular set of operations, based on the set of input parameters; and
   when determining that the one or more identifiers included in the request satisfy the cross-chain authorization information:
   communicate with the first blockchain network to execute the particular chaincode, including executing the particular set of operations, based on the set of input parameters, wherein executing the particular set of operations includes generating a set of output parameters; and
   output the set of output parameters in response to the request.

2. The device of claim 1, wherein the request is received from a particular node that is a member of a third blockchain network, wherein the one or more identifiers includes an identifier of the particular node,
   wherein determining that the one or more identifiers included in the request satisfy the cross-chain authorization information included in the second blockchain includes determining that the cross-chain authorization information includes the identifier of the particular node.

3. The device of claim 1, wherein the one or more processors are further configured to:
   communicate with the second set of nodes of the second blockchain network to record the cross-chain authorization information to the second blockchain.

4. The device of claim 3, wherein the one or more identifiers include an identifier of a particular node of the second blockchain network, wherein the particular node identifies based on the cross-chain authorization information that the particular node is authorized to request invocation of the particular set of operations.

5. The device of claim 4, wherein the particular node presents a user interface, that includes one or more options to invoke the particular set of operations, based on identifying that the particular node is authorized to request invocation of the particular set of operations.

6. The device of claim 1, wherein outputting the set of output parameters includes communicating with the second set of nodes of the second blockchain network to record, to the second blockchain, an indication that the set of output parameters have been generated.

7. The device of claim 1, wherein the request is a first request, wherein the one or more processors are further configured to:
   identify a second request to invoke the particular set of operations, wherein the second request includes a particular set of identifiers;
   determine that the particular set of identifiers, included in the second request, do not satisfy the cross-chain authorization information included in the second blockchain; and
   forgo initiating invocation, by the first blockchain network, of the particular set of operations in response to the second request based on determining that the particular set of identifiers, included in the second request, do not satisfy the cross-chain authorization information included in the second blockchain.

8. A non-transitory computer-readable medium, storing a plurality of processor-executable instructions to:
   communicate with a first set of nodes of a first blockchain network to maintain a first blockchain, wherein a first set of records recorded to the first blockchain include chaincode that specifies a plurality of sets of operations;
   communicate with a second set of nodes of a second blockchain network to maintain a second blockchain, wherein a second set of records recorded to the second blockchain include cross-chain authorization information that includes a set of identifiers;
   identify a request to invoke particular chaincode, which includes a particular set of operations of the plurality of sets of operations included in the first set of records recorded to the first blockchain, wherein the request includes:
   a set of input parameters, and
   one or more identifiers;
   compare the one or more identifiers, included in the request, to the set of identifiers included in the cross-chain authorization information included in the second set of records recorded to the second blockchain;
   determine, based on the comparing, whether the one or more identifiers included in the request satisfy the cross-chain authorization information included in the second blockchain;
   when determining that the one or more identifiers included in the request do not satisfy the cross-chain authorization information, forgo causing with the second blockchain network to execute the particular chaincode, which includes the particular set of operations, based on the set of input parameters; and
   when determining that the one or more identifiers included in the request satisfy the cross-chain authorization information:
   communicate with the first blockchain network to execute the particular chaincode, including executing the particular set of operations, based on the set of input parameters, wherein executing the particular set of operations includes generating a set of output parameters; and output the set of output parameters in response to the request.

9. The non-transitory computer-readable medium of claim 8, wherein the request is received from a particular node that is a member of a third blockchain network, wherein the one or more identifiers includes an identifier of the particular node, wherein determining that the one or more identifiers included in the request satisfy the cross-chain authorization information included in the second blockchain includes determining that the cross-chain authorization information includes the identifier of the particular node.

10. The non-transitory computer-readable medium of claim 8, wherein the plurality of processor-executable instructions further include processor-executable instructions to:

communicate with the second set of nodes of the second blockchain network to record the cross-chain authorization information to the second blockchain.

11. The non-transitory computer-readable medium of claim 10, wherein the one or more identifiers include an identifier of a particular node of the second blockchain network, wherein the particular node identifies based on the cross-chain authorization information that the particular node is authorized to request invocation of the particular set of operations.

12. The non-transitory computer-readable medium of claim 11, wherein the particular node presents a user interface, that includes one or more options to invoke the particular set of operations, based on identifying that the particular node is authorized to request invocation of the particular set of operations.

13. The non-transitory computer-readable medium of claim 8, wherein outputting the set of output parameters includes communicating with the second set of nodes of the second blockchain network to record, to the second blockchain, an indication that the set of output parameters have been generated.

14. The non-transitory computer-readable medium of claim 8, wherein the request is a first request, wherein the plurality of processor-executable instructions further include processor-executable instructions to:

identify a second request to invoke the particular set of operations, wherein the second request includes a particular set of identifiers;

determine that the particular set of identifiers, included in the second request, do not satisfy the cross-chain authorization information included in the second blockchain; and forgo initiating invocation, by the first blockchain network, of the particular set of operations in response to the second request.

15. A method, comprising:

communicating with a first set of nodes of a first blockchain network to maintain a first blockchain, wherein a first set of records recorded to the first blockchain include chaincode that specifies a plurality of sets of operations;

communicating with a second set of nodes of a second blockchain network to maintain a second blockchain, wherein a second set of records recorded to the second blockchain include cross-chain authorization information that includes a set of identifiers;

identify a request to invoke particular chaincode, which includes a particular set of operations of the plurality of sets of operations included in the first set of records recorded to the first blockchain, wherein the request includes:

a set of input parameters, and one or more identifiers;

comparing the one or more identifiers, included in the request, to the set of identifiers included in the cross-chain authorization information included in the second set of records recorded to the second blockchain;

determining, based on the comparing, whether the one or more identifiers included in the request satisfy the cross-chain authorization information included in the second blockchain;

when determining that the one or more identifiers included in the request do not satisfy the cross-chain authorization information, forgoing causing the second blockchain network to execute the particular chaincode, which includes the particular set of operations, based on the set of input parameters; and when determining that the one or more identifiers included in the request satisfy the cross-chain authorization information;

communicating with the first blockchain network to execute the particular chaincode, including executing the particular set of operations, based on the set of input parameters, wherein executing the particular set of operations includes generating a set of output parameters; and outputting the set of output parameters in response to the request.

16. The method of claim 15, wherein the request is received from a particular node that is a member of a third blockchain network, wherein the one or more identifiers includes an identifier of the particular node, wherein determining that the one or more identifiers included in the request satisfy the cross-chain authorization information included in the second blockchain includes determining that the cross-chain authorization information includes the identifier of the particular node.

17. The method of claim 15, further comprising:

communicating with the second set of nodes of the second blockchain network to record the cross-chain authorization information to the second blockchain.

18. The method of claim 17, wherein the one or more identifiers include an identifier of a particular node of the second blockchain network, wherein the particular node:

identifies based on the cross-chain authorization information that the particular node is authorized to request invocation of the particular set of operations, and presents a user interface, that includes one or more options to invoke the particular set of operations, based on identifying that the particular node is authorized to request invocation of the particular set of operations.

19. The method of claim 15, wherein outputting the set of output parameters includes communicating with the second set of nodes of the second blockchain network to record, to the second blockchain, an indication that the set of output parameters have been generated.

20. The method of claim 15, wherein the request is a first request, the method further comprising:

identifying a second request to invoke the particular set of operations, wherein the second request includes a particular set of identifiers;

determining that the particular set of identifiers, included in the second request, do not satisfy the cross-chain authorization information included in the second blockchain; and forgoing initiating invocation, by the first blockchain network, of the particular set of operations in response to the second request.

\* \* \* \* \*